US012593381B2

(12) United States Patent
Yang et al.

(10) Patent No.: US 12,593,381 B2
(45) Date of Patent: Mar. 31, 2026

(54) ILLUMINATION CIRCUIT

(71) Applicant: Primax Electronics Ltd., Taipei (TW)

(72) Inventors: Yu-Zeng Yang, Taipei (TW); Sheng-Wen Wang, Taipei (TW); Hui-Ling Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 135 days.

(21) Appl. No.: 18/587,399

(22) Filed: Feb. 26, 2024

(65) Prior Publication Data

US 2025/0234435 A1 Jul. 17, 2025

(30) Foreign Application Priority Data

Jan. 12, 2024 (TW) ................................ 113101351

(51) Int. Cl.

*H05B 45/20* (2020.01)
*H05B 45/24* (2020.01)
*H05B 45/52* (2020.01)
*H05B 45/54* (2020.01)

(52) U.S. Cl.

CPC ............. *H05B 45/24* (2020.01); *H05B 45/52* (2020.01); *H05B 45/54* (2020.01)

(58) Field of Classification Search

CPC ........ H05B 45/20; H05B 45/24; H05B 45/40; H05B 45/52; H05B 45/54

See application file for complete search history.

(56) References Cited

U.S. PATENT DOCUMENTS

| | | | | |
|---|---|---|---|---|
| 9,402,288 B2 * | 7/2016 | Xu | ......................... | H05B 45/37 |
| 9,949,340 B2 * | 4/2018 | Yu | ......................... | H05B 47/198 |
| 10,667,362 B1 * | 5/2020 | Coetzee | ................. | H05B 45/39 |
| 2010/0328946 A1 * | 12/2010 | Borkar | ................... | H05B 47/19<br>362/249.02 |
| 2012/0007514 A1 * | 1/2012 | Lin | ......................... | H05B 45/20<br>315/185 R |
| 2017/0290123 A1 * | 10/2017 | Wu | ......................... | H05B 45/20 |
| 2020/0205259 A1 * | 6/2020 | Hagelaar | ................ | H05B 45/24 |

* cited by examiner

*Primary Examiner* — Thai Pham

(74) *Attorney, Agent, or Firm* — KIRTON McCONKIE; Evan R. Witt

(57) ABSTRACT

An illumination circuit includes a first voltage source, plural first light-emitting diodes, plural first resistive elements, a first impedance element, a second voltage source, plural second light-emitting diodes, plural second resistive elements and a second impedance element. The plural first light-emitting diodes are connected with each other in parallel. A first terminal of each first resistive element is connected with a first output terminal of the corresponding first light-emitting diode. A second terminal of each first resistive element is connected with a first negative electrode of the first voltage source. A first terminal of the first impedance element is connected with a first positive electrode of the first voltage source. A second terminal of the first impedance element is connected with a first input terminal of each first light-emitting diodes. The plural second light-emitting diodes are connected with each other in parallel.

18 Claims, 3 Drawing Sheets

ILLUMINATION CIRCUIT

FIELD OF THE INVENTION

The present invention relates to an illumination circuit, and more particularly to an illumination circuit with cold color temperature light-emitting diodes and warm color temperature light-emitting diodes.

BACKGROUND OF THE INVENTION

When light-emitting diodes are manufactured, their photoelectric characteristics such as colors, luminous fluxes or voltages usually have certain variations. Therefore, before the light-emitting diodes leave the factory, the light-emitting diodes will be classified and graded. The light-emitting diodes with similar characteristics are classified together. The classifying and grading procedures can ensure that the same batch of light-emitting diodes can meet the specifications and standards required by customers.

However, even if the classifying and grading procedures have been carried out before the light-emitting diodes leave the factory, there may still be some differences in the optoelectronic characteristics between different batches of light-emitting diodes shipped from the factory. In case that an illumination circuit is provided with plural light-emitting diodes, these differences are easily highlighted to affect the quality of the product. Therefore, it is important to reduce the variability in the output light between light-emitting diodes or between illumination circuits containing plural light-emitting diodes and make the optoelectronic characteristics more consistent.

Moreover, in case that the illumination circuit comprises plural cold color temperature light-emitting diodes and plural warm color temperature light-emitting diodes to produce the mixed light beams, it is more difficult to obtain the ideal or predetermined color temperature output of the mixed light beams because of the color differences in the light-emitting diodes.

SUMMARY OF THE INVENTION

In order to overcome the drawbacks of the conventional technologies, the present invention provides an illumination circuit capable of reducing the variability in the output light between light-emitting diodes. Moreover, the hardware component is specially designed to compensate for the inherent differences between light-emitting diodes while reducing the complexity of material preparation.

In accordance with an aspect of the present invention, an illumination circuit is provided. The illumination circuit includes a first voltage source, plural first light-emitting diodes, plural first resistive elements, a first impedance element, a second voltage source, plural second light-emitting diodes, plural second resistive elements and a second impedance element. The first voltage source has a first positive electrode and a first negative electrode. The plural first light-emitting diodes are cold color temperature light-emitting diodes. The plural first light-emitting diodes are connected with each other in parallel. Each of the plural first light-emitting diodes has a first input terminal and a first output terminal. A first terminal of each first resistive element is connected with the first output terminal of the corresponding first light-emitting diode. A second terminal of each first resistive element is connected with the first negative electrode of the first voltage source. A first terminal of the first impedance element is connected with the first positive electrode of the first voltage source. A second terminal of the first impedance element is connected with the first input terminal of each first light-emitting diodes. The second voltage source has a second positive electrode and a second negative electrode. The plural second light-emitting diodes are warm color temperature light-emitting diodes. The plural second light-emitting diodes are connected with each other in parallel. Each of the plural second light-emitting diodes has a second input terminal and a second output terminal. A first terminal of each second resistive element is connected with the second output terminal of the corresponding second light-emitting diode. A second terminal of each second resistive element is connected with the second negative electrode of the second voltage source. A first terminal of the second impedance element is connected with the second positive electrode of the second voltage source. A second terminal of the second impedance element is connected with the second input terminal of each second light-emitting diode.

In an embodiment, the first voltage source provides a first driving voltage, and a voltage from the first input terminal of each first light-emitting diode to the first negative electrode of the first voltage source is a first set voltage. When a first current flows through each first light-emitting diode, a forward voltage of each first light-emitting diode is in a range between a first maximum forward voltage and a first minimum forward voltage, and a resistance value of each first resistive element=(the first set voltage−(the first maximum forward voltage+the first minimum forward voltage)/2)/the first current.

In an embodiment, the first driving voltage is 5V, the first set voltage is 4.5V, the first current is 20 mA, the first maximum forward voltage is 2.9V, and the first minimum forward voltage is 2.7V.

In an embodiment, the first driving voltage is 5V, the first set voltage is 4.5V, the first current is 20 mA, the first maximum forward voltage is 3.1V, and the first minimum forward voltage is 2.9V.

In an embodiment, the first driving voltage is 5V, the first set voltage is 4.5V, the first current is 20 mA, the first maximum forward voltage is 3.3V, and the first minimum forward voltage is 3.1V.

In an embodiment, the first voltage source provides a first driving voltage, a voltage from the first input terminal of each first light-emitting diode to the first negative electrode of the first voltage source is a first set voltage, a first current flows through each first light-emitting diode, and a number of the plural first light-emitting diodes is N. An impedance value of the first impedance element=(the first driving voltage−the first set voltage)/(the first current×N×the chromaticity adjustment value), and the chromaticity adjustment value is less than or equal to 1.2 and greater than or equal to 0.8.

In an embodiment, the first driving voltage is 5V, the first set voltage is 4.5V, the first current is 20 mA, and the chromaticity adjustment value is 1.2, 1.15, 1.1, 1.05, 1, 0.95, 0.9, 0.85 or 0.8.

In an embodiment, the second voltage source provides a second driving voltage, and a voltage from the second input terminal of each second light-emitting diode to the second negative electrode of the second voltage source is a second set voltage. When a second current flows through each second light-emitting diode, a forward voltage of each second light-emitting diode is in a range between a second maximum forward voltage and a second minimum forward voltage, and a resistance value of each second resistive element=(the second set voltage−(the second maximum forward voltage+the second minimum forward voltage)/2)/the second current.

In an embodiment, the second driving voltage is 5V, the second set voltage is 4.5V, the second current is 20 mA, the second maximum forward voltage is 2.9V, and the second minimum forward voltage is 2.7V.

In an embodiment, the second driving voltage is 5V, the second set voltage is 4.5V, the second current is 20 mA, the second maximum forward voltage is 3.1V, and the second minimum forward voltage is 2.9V.

In an embodiment, the second driving voltage is 5V, the second set voltage is 4.5V, the second current is 20 mA, the second maximum forward voltage is 3.3V, and the second minimum forward voltage is 3.1V.

In an embodiment, the second voltage source provides a second driving voltage, a voltage from the second input terminal of each second light-emitting diode to the second negative electrode of the second voltage source is a second set voltage, a second current flows through each second light-emitting diode, and a number of the plural second light-emitting diodes is N. An impedance value of the second impedance element=(the second driving voltage−the second set voltage)/(the second current×N×the chromaticity adjustment value), and the chromaticity adjustment value is less than or equal to 1.2 and greater than or equal to 0.8.

In an embodiment, the second driving voltage is 5V, the second set voltage is 4.5V, the second current is 20 mA, and the chromaticity adjustment value is 1.2, 1.15, 1.1, 1.05, 1, 0.95, 0.9, 0.85 or 0.8.

In an embodiment, one of the plural first light-emitting diodes and one of the plural second light-emitting diodes are packaged as a single dual-color light-emitting diode.

In an embodiment, the first impedance element includes a single resistor, plural series-connected resistors or plural parallel-connected resistors.

In an embodiment, the second impedance element includes a single resistor, plural series-connected resistors or plural parallel-connected resistors.

In an embodiment, the first resistive element includes a single resistor, plural series-connected resistors or plural parallel-connected resistors.

In an embodiment, the second resistive element includes a single resistor, plural series-connected resistors or plural parallel-connected resistors.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

An illumination circuit according to a first embodiment of the present invention will be described as follows. This illumination circuit can be applied to the electronic devices requiring the backlighting function or the electronic devices whose housings have light effects. For example, this illumination circuit is applied to keyboards, mouse devices, headphones, or consoles.

Figure 1:
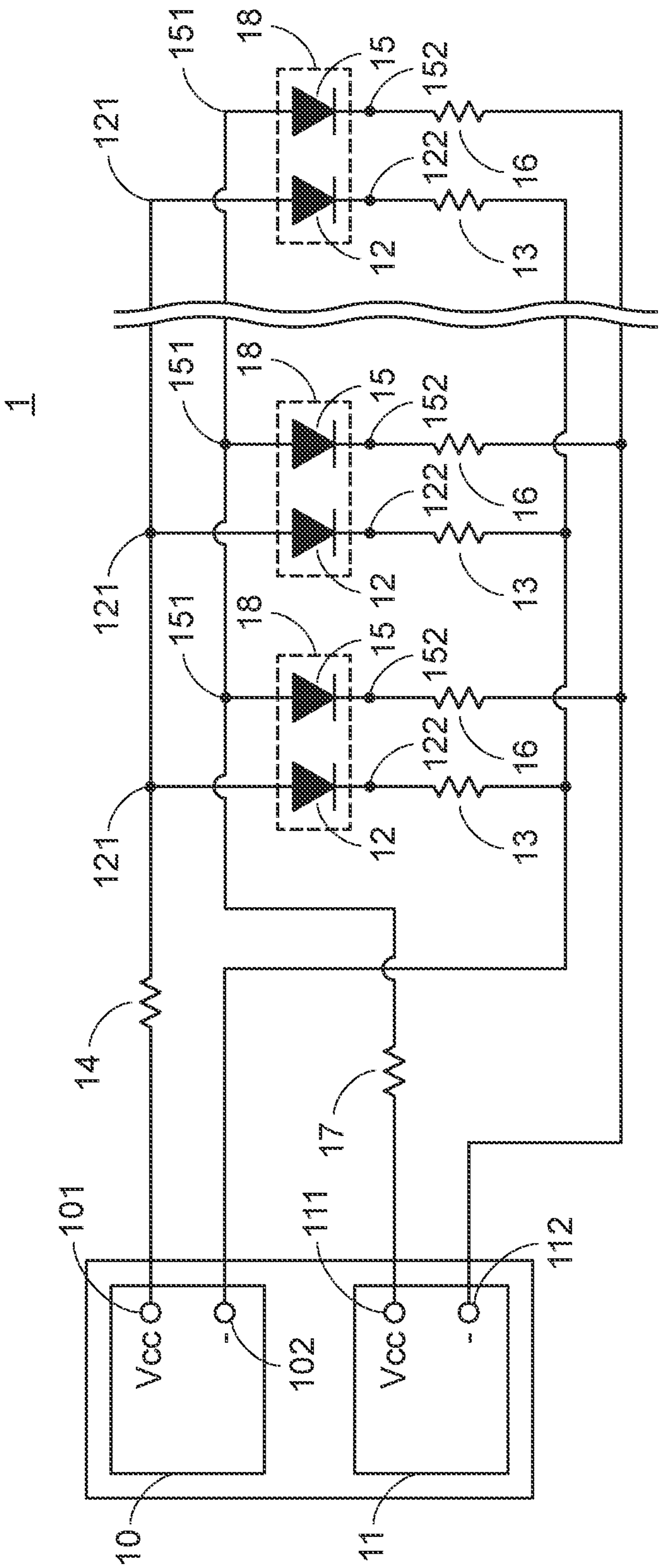
FIG. 1 is a schematic circuit diagram illustrating an illumination circuit according to a first embodiment of the present invention.

FIG. 1 is a schematic circuit diagram illustrating an illumination circuit according to a first embodiment of the present invention. As shown in FIG. 1, the illumination circuit 1 comprises a first voltage source 10, a second voltage source 11, plural first light-emitting diodes 12, plural first resistive elements 13, a first impedance element 14, plural second light-emitting diodes 15, plural second resistive elements 16 and a second impedance element 17.

In an embodiment, the first voltage source 10 and the second voltage source 11 are separate voltage sources. Alternatively, the first voltage source 10 and the second voltage source 11 are integrated into the same voltage source.

The first voltage source 10 has a first positive electrode 101 and a first negative electrode 102. The first voltage source 10 provides a first driving voltage. The plural first light-emitting diodes 12 are cold color temperature light-emitting diodes, and the color temperature value of the cold color temperature is greater than 5000K. The plural first light-emitting diodes 12 are connected with each other in parallel. Each first light-emitting diode 12 has a first input terminal 121 and a first output terminal 122. The first terminal of each first resistive element 13 is connected with the first output terminal 122 of the corresponding first light-emitting diode 12. The second terminal of each first resistive element 13 is connected with the first negative electrode 102 of the first voltage source 10. The first terminal of the first impedance element 14 is connected with the first positive electrode 101 of the first voltage source 10. The second terminal of the first impedance element 14 is connected with the first input terminals 121 of all first light-emitting diodes 12.

The second voltage source 11 has a second positive electrode 111 and a second negative electrode 112. The second voltage source 11 provides a second driving voltage. The plural second light-emitting diodes 15 are warm color temperature light-emitting diodes, and the color temperature value of the warm color temperature is less than 5000K. The plural second light-emitting diodes 15 are connected with each other in parallel. Each second light-emitting diode 15 has a second input terminal 151 and a second output terminal 152. The first terminal of each second resistive element 16 is connected with the second output terminal 152 of the corresponding second light-emitting diode 15. The second terminal of each second resistive element 16 is connected with the second negative electrode 112 of the second voltage source 11. The first terminal of the second impedance element 17 is connected with the second positive electrode 111 of the second voltage source 11. The second terminal of the second impedance element 17 is connected with the second input terminal 151 of all second light-emitting diodes 15.

Please refer to Table 1, which illustrates an example of the forward voltage specification recorded in the specification sheet when the light-emitting diode leaves the factory. It can be understood from Table 1 that even if the light-emitting diodes have been classified into the same level when leaving the factory, the forward voltages are possibly different when the same current flows through them.

TABLE 1

Forward voltage specification table for light-emitting diodes

| Forward voltage | Forward voltage when forward current is 20 mA | |
|---|---|---|
| classification level | Minimum forward voltage (volts) | Maximum forward voltage (volts) |
| V1 | 2.7 | 2.9 |
| V2 | 2.9 | 3.1 |
| V3 | 3.1 | 3.3 |

When a resistor is installed or selected, the resistance value of the resistor is calculated according to a specified mathematic formula, which will be described later. Consequently, the variability in the forward voltage of the light-emitting diodes can be reduced, the specifications of the resistor used with each light-emitting diode can be unified, and the material preparation complexity can be reduced.

For example, it is assumed that the voltage from the first input terminal 121 of each first light-emitting diode 12 to the first negative electrode 102 of the first voltage source 10 is a first set voltage. Moreover, the forward voltage of each first light-emitting diode 12 is known to be between a first maximum forward voltage and a first minimum forward voltage when a first current flows through each first light-emitting diode 12. Under this circumstance, the resistance value of each first resistive element 13=(the first set voltage−(the first maximum forward voltage+the first minimum forward voltage)/2)/the first current.

For example, the plural first light-emitting diodes 12 have been classified into the Classification level V1 in Table 1 when they leave the factory. If the first driving voltage provided by the first voltage source 10 is 5V, the first set voltage is 4.5V and the first current is 20 mA, it can be known from the specification table that the first maximum forward voltage of the plural first light-emitting diodes 12 is 2.9V and the first minimum forward voltage is 2.7V. Under the above conditions, the resistance value of the first resistive element 13 selected to be used with the first light-emitting diode 12 is (4.5−(2.9+2.7)/2)/0.02=85Ω.

For example, the plural first light-emitting diodes 12 have been classified into the Classification level V2 in Table 1 when they leave the factory. If the first driving voltage provided by the first voltage source 10 is 5V, the first set voltage is 4.5V and the first current is 20 mA, it can be known from the specification table that the first maximum forward voltage of the plural first light-emitting diodes 12 is 3.1V and the first minimum forward voltage is 2.9V. Under the above conditions, the resistance value of the first resistive element 13 selected to be used with the first light-emitting diode 12 is (4.5−(3.1+2.9)/2)/0.02=7552.

For example, the plural first light-emitting diodes 12 have been classified into the Classification level V3 in Table 1 when they leave the factory. If the first driving voltage provided by the first voltage source 10 is 5V, the first set voltage is 4.5V and the first current is 20 mA, it can be known from the specification table that the first maximum forward voltage of the plural first light-emitting diodes 12 is 3.3V and the first minimum forward voltage is 3.1V. Under the above conditions, the resistance value of the first resistive element 13 selected to be used with the first light-emitting diode 12 is (4.5−(3.3+3.1)/2)/0.02=6552.

As for the second light-emitting diode 15 (i.e., the warm color temperature light-emitting diode), the resistance value of the corresponding second resistive element 16 is determined according to the above logic relationship between the first light-emitting diode 12 and the first resistive element 13.

For example, it is assumed that the voltage from the second input terminal 151 of each second light-emitting diode 15 to the second negative electrode 112 of the second voltage source 11 is a second set voltage. Moreover, the forward voltage of each second light-emitting diode 15 is known to be between a second maximum forward voltage and a second minimum forward voltage when a second current flows through each second light-emitting diode 15. Under this circumstance, the resistance value of each second resistive element 16=(the second set voltage−(second maximum forward voltage+the second minimum forward voltage)/2)/the second current.

For example, the plural second light-emitting diodes 15 have been classified into the Classification level V1 in Table 1 when they leave the factory. If the second driving voltage provided by the second voltage source 11 is 5V, the second set voltage is 4.5V and the second current is 20 mA, it can be known from the specification table that the second maximum forward voltage of the plural second light-emitting diodes 12 is 2.9V and the second minimum forward voltage is 2.7V. Under the above conditions, the resistance value of the second resistive element 16 selected to be used with the second light-emitting diode 15 is (4.5−(2.9+2.7)/2)/0.02=8552.

For example, the plural second light-emitting diodes 15 have been classified into the Classification level V2 in Table 1 when they leave the factory. If the second driving voltage provided by the second voltage source 11 is 5V, the second set voltage is 4.5V and the second current is 20 mA, it can be known from the specification table that the second maximum forward voltage of the plural second light-emitting diodes 15 is 3.1V and the second minimum forward voltage is 2.9V. Under the above conditions, the resistance value of the second resistive element 16 selected to be used with the second light-emitting diode 15 is (4.5−(3.1+2.9)/2)/0.02=7552.

For example, the plural second light-emitting diodes 15 have been classified into the Classification level V3 in Table 1 when they leave the factory. If the second driving voltage provided by the second voltage source 11 is 5V, the second set voltage is 4.5V and the second current is 20 mA, it can be known from the specification table that the second maximum forward voltage of the plural second light-emitting diodes 15 is 3.3V and the second minimum forward voltage is 3.1V. Under the above conditions, the resistance value of the second resistive element 16 selected to be used with the second light-emitting diode 15 is (4.5−(3.3+3.1)/2)/0.02=6552.

From the above description, the present invention provides an illumination circuit for allowing the same color temperature type of light-emitting diodes to produce the consistent color temperature during operations. In the above embodiment, the variations in the forward voltages of all light-emitting diodes are taken into consideration. After referring to the specifications of the light-emitting diodes and understanding the forward voltage classification of the wholesale light-emitting diodes, the manufacturer may take the average value of the maximum forward voltage and the minimum forward voltage as the preset forward voltage of the plural light-emitting diodes. According to this criterion, the resistors of the same specification are selected to be installed and used with the corresponding light-emitting diodes. Since it is not necessary to prepare resistors of various specifications, the complexity of material preparation is simplified when compared with the conventional technologies. In other words, if the assembly manufacturer knows that the first light-emitting diode 12 or the second light-emitting diode 15 imported this time belongs to the Classification level V1, V2 or V3, the first resistive element 13 or the second resistive element 16 with the resistance value of 85Ω, 75Ω or 65Ω will be prepared.

In an embodiment, the illumination circuit 1 is equipped with dual-color light-emitting diodes. That is, the die of the first light-emitting diode 12 and die of the second light-emitting diode 15 are packaged together and formed as a single dual-color light-emitting diode 18.

The illumination circuit 1 of the present invention can also drive the first light-emitting diode 12 with the cold color temperature and the second light-emitting diode 15 with the warm color temperature to produce the mixed light beams and then output a specified color temperature. During the light mixing process, the ratio of the current flowing through the first light-emitting diode 12 with the cold color temperature and the current flowing through the second light-emitting diode 15 with the warm color temperature is appropriately adjusted to achieve the desired ideal color temperature. However, since the photoelectric properties of each batch of light-emitting diodes are different, it is not easy to mix the ideal color temperature. For example, when a light-emitting diode is driven with a certain voltage, if the forward voltage of the cold color temperature light-emitting diode of this batch is higher, its input current will be lower than the predetermined value. Consequently, the brightness is lower. After the light mixing process, the overall output color temperature will be warmer. In another situation, the brightness (luminous flux) of the batch of cold color temperature light-emitting diodes are low, or the color coordinates (color) of the cold color temperature light-emitting diodes are relatively warm. After the light mixing process, the color temperature will also be warmer and deviated from the ideal predetermined value. For solving the drawbacks, it is necessary to make the batch of cold color temperature light-emitting diodes or warm color temperature light-emitting diodes to be close to or have the ideal predetermined color temperature before the light mixing process. Consequently, the subsequent light mixing process can be performed in a more precise manner.

In view of the above needs, the present invention also proposes a design that can reduce the difference in color variation between the cold color temperature light-emitting diodes and the warm color temperature light-emitting diodes.

Figure 2:
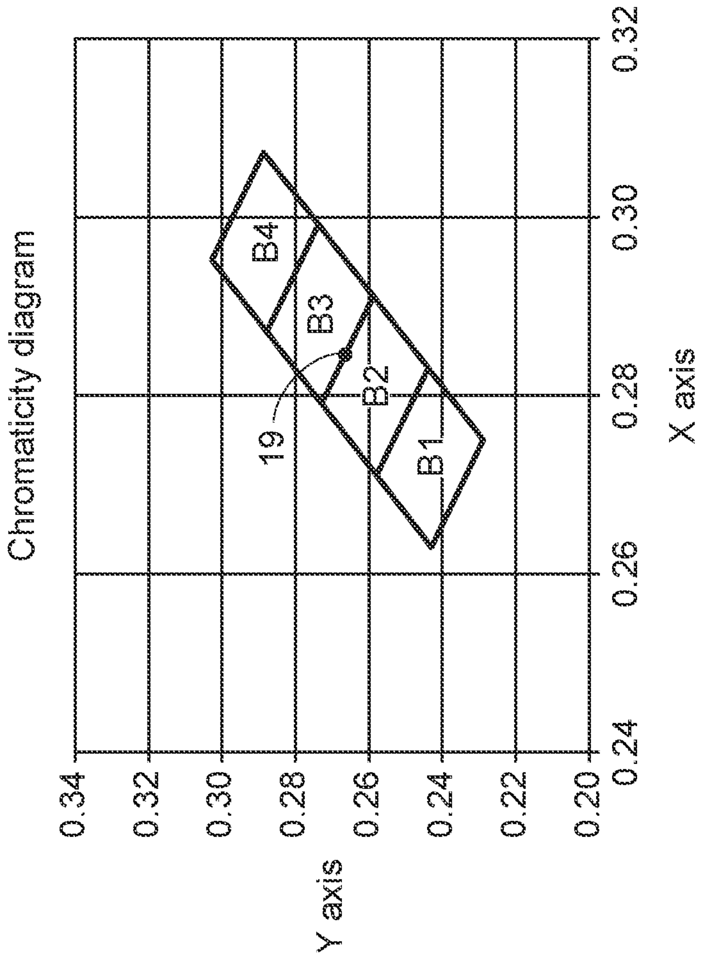
FIG. 2 is a chromaticity diagram illustrating the distribution of the color classification levels of different cold color temperature light-emitting diodes in the chromaticity coordinate system.

Please refer to Table 2 and FIG. 2. Table 2 is a color classification table illustrating the color classification of the cold color temperature light-emitting diodes. FIG. 2 is a chromaticity diagram illustrating the distribution of the color classification levels of different cold color temperature light-emitting diodes in the chromaticity coordinate system. As shown in Table 2, the cold color temperature light-emitting diodes can be divided into four levels on the classification table, including B1, B2, B3 and B4. Through the four sets of X coordinates and Y coordinates marked by each classification level, the range of the color variations belonging to each classification level can be defined in the chromaticity diagram of FIG. 2. That is, FIG. 2 shows the relative relationship between the color change ranges of the four classification levels B1, B2, B3 and B4 and an ideal central classification level position 19 on the coordinate axes. After calculation or estimation, the degree of variation between the four classification levels B1, B2, B3 and B4 and the ideal central classification level position 19 can be obtained. Accordingly, the resistance value of the first impedance element 14 is adjusted for compensation.

TABLE 2

Color classification table

| Level | | Color classification when forward current is 20 mA CIE 1931 xy coordinates | | | |
|---|---|---|---|---|---|
| B1 | x | 0.2630 | 0.2750 | 0.2830 | 0.2710 |
| | y | 0.2430 | 0.2290 | 0.2440 | 0.2580 |
| B2 | x | 0.2710 | 0.2830 | 0.2910 | 0.2790 |
| | y | 0.2580 | 0.2440 | 0.2590 | 0.2730 |
| B3 | x | 0.2790 | 0.2910 | 0.2990 | 0.2870 |
| | y | 0.2730 | 0.2590 | 0.2740 | 0.2880 |
| B4 | x | 0.2870 | 0.2990 | 0.3070 | 0.2950 |
| | y | 0.2880 | 0.2740 | 0.2890 | 0.3030 |

In the illumination circuit of this embodiment, the resistance value of the first impedance element 14 is set according to an additional parameter (e.g., a chromaticity adjustment value). According to the degree of variation between the classification levels of the arriving batch of cold color temperature light-emitting diodes and the and the ideal central classification level position 19, the resistance value of the first impedance element 14 is adjusted.

For example, it is assumed that the first voltage source 10 provides a first driving voltage, the voltage from the first input terminal 121 of each first light-emitting diode 12 to the first negative electrode 102 of the first voltage source 10 is a first set voltage, and a first current flows through each first light-emitting diode 12. In addition, the number of parallel-connected first light-emitting diodes 12 is N. Consequently, the impedance value of the first impedance element 14=(the first driving voltage−the first set voltage)/(the first current×N×the chromaticity adjustment value), and the chromaticity adjustment value is less than or equal to 1.2 and greater than or equal to 0.8.

For example, the illumination circuit 1 comprises 17 first light-emitting diodes 12 in parallel connection, and the 17 first light-emitting diodes 12 have been classified into the Classification level B1 in Table 2 when they leave the factory. The testing or calculating result indicates that the color temperature of the Classification level B1 is cooler when compared with the ideal central classification level position 19, and the difference is about −15%. Under this circumstance, the chromaticity adjustment value is set as 0.85. If the first driving voltage provided by the first voltage source 10 is 5V, the first set voltage is 4.5V and the first current is 20 mA, the impedance value of the first impedance element 14 is (5−4.5)/(0.02*17*0.85)=1.73Ω. After the above calibration of the hardware component, the cold color temperature light-emitting diodes belonging to different classification levels are compensated by adjusting the resistance value of the first impedance element 14. Consequently, the plural first light-emitting diodes 12 can output the ideal color temperature.

For example, the 17 parallel-connected first light-emitting diodes 12 have been classified into the Classification level B2 in Table 2 when they leave the factory. The color temperature of the Classification level B2 is slightly cooler when compared with the ideal central classification level position 19. Under this circumstance, the chromaticity adjustment value is set as 0.95. If the first driving voltage provided by the first voltage source 10 is 5V, the first set voltage is 4.5V and the first current is 20 mA, the impedance value of the first impedance element 14 is (5−4.5)/(0.02*17*0.95)=1.55Ω.

For example, the 17 parallel-connected first light-emitting diodes 12 have been classified into the Classification level B3 in Table 2 when they leave the factory. The color temperature of the Classification level B3 is slightly warmer when compared with the ideal central classification level position 19. Under this circumstance, the chromaticity adjustment value is set as 1.05. If the first driving voltage provided by the first voltage source 10 is 5V, the first set voltage is 4.5V and the first current is 20 mA, the impedance value of the first impedance element 14 is (5−4.5)/(0.02*17*1.05)−1.4Ω.

For example, the 17 parallel-connected first light-emitting diodes 12 have been classified into the Classification level B4 in Table 2 when they leave the factory. The color temperature of the Classification level B4 is warmer when compared with the ideal central classification level position 19. Under this circumstance, the chromaticity adjustment value is set as 1.15. If the first driving voltage provided by the first voltage source 10 is 5V, the first set voltage is 4.5V and the first current is 20 mA, the impedance value of the first impedance element 14 is (5−4.5)/(0.02*17*1.15) =1.28Ω.

Figure 3:
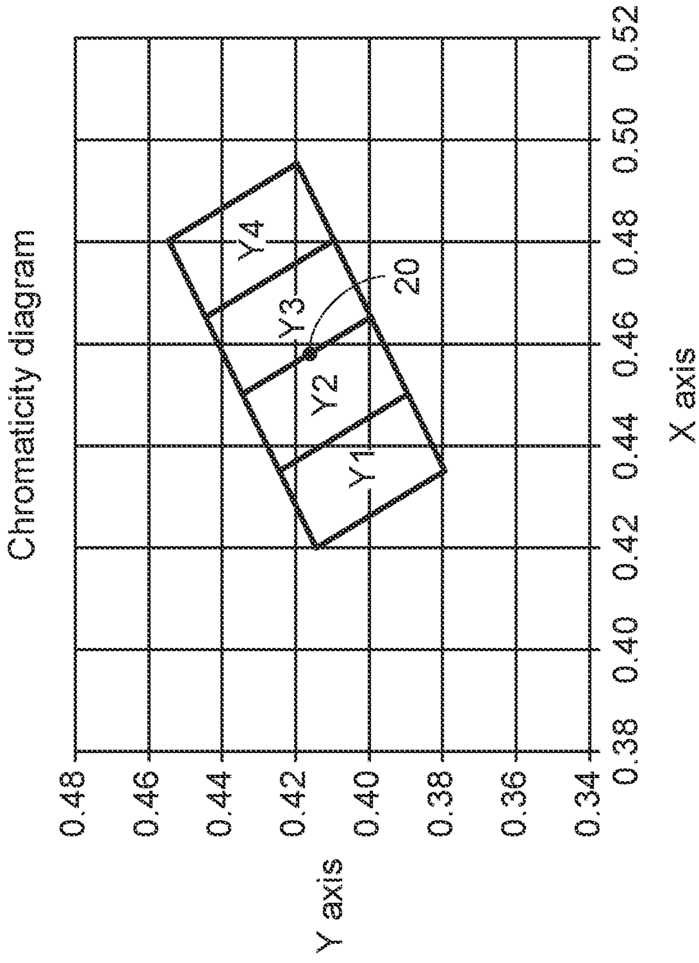
FIG. 3 is a chromaticity diagram illustrating the distribution of the color classification levels of different warm color temperature light-emitting diodes in the chromaticity coordinate system.

The design of reducing the difference in color variation between light-emitting diodes is also applied to the warm color temperature light-emitting diodes. Please refer to Table 3 and FIG. 3. Table 3 is a color classification table illustrating the color classification of the warm color temperature light-emitting diodes. FIG. 3 is a chromaticity diagram illustrating the distribution of the color classification levels of different warm color temperature light-emitting diodes in the chromaticity coordinate system. As shown in Table 3, the warm color temperature light-emitting diodes can be divided into four levels on the classification table, including Y1, Y2, Y3 and Y4. Through the four sets of X coordinates and Y coordinates marked by each classification level, the range of the color variations belonging to each classification level can be defined in the chromaticity diagram of FIG. 3. That is, FIG. 3 shows the relative relationship between the color change ranges of the four classification levels Y1, Y2, Y3 and Y4 and an ideal central classification level position 20 on the coordinate axes. After calculation or estimation, the degree of variation between the four classification levels Y1, Y2, Y3 and Y4 and the ideal central classification level position 20 can be obtained. Accordingly, the resistance value of the second impedance element 17 is adjusted for compensation.

TABLE 3

Color classification table

| Level | | Color classification when forward current is 20 mA CIE 1931 xy coordinates | | | |
|---|---|---|---|---|---|
| Y1 | x | 0.4200 | 0.4350 | 0.4500 | 0.4350 |
| | y | 0.4150 | 0.3800 | 0.3900 | 0.4250 |
| Y2 | x | 0.4350 | 0.4500 | 0.4650 | 0.4500 |
| | y | 0.4250 | 0.3900 | 0.4000 | 0.4350 |
| Y3 | x | 0.4500 | 0.4650 | 0.4800 | 0.4650 |
| | y | 0.4350 | 0.4000 | 0.4100 | 0.4450 |
| Y4 | x | 0.4650 | 0.4800 | 0.4950 | 0.4800 |
| | y | 0.4450 | 0.4100 | 0.4200 | 0.4550 |

In the illumination circuit of this embodiment, the resistance value of the second impedance element 17 is set according to an additional parameter (e.g., a chromaticity adjustment value). According to the degree of variation between the classification levels of the arriving batch of warm color temperature light-emitting diodes and the and the ideal central classification level position 20, the resistance value of the second impedance element 17 is adjusted.

For example, it is assumed that the second voltage source 11 provides a second driving voltage, the voltage from the second input terminal 151 of each second light-emitting diode 15 to the second negative electrode 112 of the second voltage source 11 is a second set voltage, and a second current flows through each second light-emitting diode 15. In addition, the number of parallel-connected second light-emitting diodes 15 is N. Consequently, the impedance value of the second impedance element 17=(the second driving voltage−the second set voltage)/(the second current×N×the chromaticity adjustment value), and the chromaticity adjustment value is less than or equal to 1.2 and greater than or equal to 0.8.

For example, the illumination circuit 1 comprises 17 second light-emitting diodes 15 in parallel connection, and the 17 second light-emitting diodes 15 have been classified into the Classification level Y1 in Table 3 when they leave the factory. The testing or calculating result indicates that the color temperature of the Classification level Y1 is cooler when compared with the ideal central classification level position 20, and the difference is about-15%. Under this circumstance, the chromaticity adjustment value is set as 1.15. If the second driving voltage provided by the first voltage source 11 is 5V, the second set voltage is 4.5V and the second current is 20 mA, the impedance value of the second impedance element 17 is (5−4.5)/(0.02*17*1.15) =1.28Ω. After the above calibration of the hardware component, the cold color temperature light-emitting diodes belonging to different classification levels are compensated by adjusting the resistance value of the second impedance element 17. Consequently, the plural second light-emitting diodes 15 can output the ideal color temperature.

For example, the 17 parallel-connected second light-emitting diodes 15 have been classified into the Classification level Y2 in Table 3 when they leave the factory. The testing or calculating result indicates that the color temperature of the Classification level Y2 is slightly cooler when compared with the ideal central classification level position 20. Under this circumstance, the chromaticity adjustment value is set as 1.05. If the second driving voltage provided by the second voltage source 11 is 5V, the second set voltage is 4.5V and the second current is 20 mA, the impedance value of the second impedance element 17 is (5−4.5)/(0.02*17*1.05)=1.4Ω.

For example, the 17 parallel-connected second light-emitting diodes 15 have been classified into the Classification level Y3 in Table 3 when they leave the factory. The testing or calculating result indicates that the color temperature of the Classification level Y3 is slightly warmer when compared with the ideal central classification level position 20. Under this circumstance, the chromaticity adjustment value is set as 0.95. If the second driving voltage provided by the second voltage source 11 is 5V, the second set voltage is 4.5V and the second current is 20 mA, the impedance value of the second impedance element 17 is (5−4.5)/(0.02*17*0.95)=1.55Ω.

For example, the 17 parallel-connected second light-emitting diodes 15 have been classified into the Classification level Y4 in Table 3 when they leave the factory. The testing or calculating result indicates that the color temperature of the Classification level Y4 is warmer when compared with the ideal central classification level position 20. Under this circumstance, the chromaticity adjustment value is set as 0.85. If the second driving voltage provided by the second voltage source 11 is 5V, the second set voltage is 4.5V and the second current is 20 mA, the impedance value of the second impedance element 17 is (5−4.5)/(0.02*17*0.85) =1.73Ω.

Due to the above design, the illumination circuit 1 can drive the compensated cold color temperature first light-emitting diodes 12 and the compensated warm color temperature second light-emitting diodes 15 to produce the mixed light beams. Consequently, the illumination circuit 1 can accurately output the expected color temperature.

In an embodiment of the illumination circuit 1, each of the first impedance element 14 and the second impedance element 17 is a single resistor that can withstand a large current. In some other embodiments, each of the first impedance element 14 and the second impedance element 17 is composed of plural series-connected resistors or plural parallel-connected resistors.

In an embodiment of the illumination circuit 1, each of the first resistive element 13 and the second resistive element 16 is a single resistor that can withstand a large current. In some other embodiments, each of the first resistive element 13 and the second resistive element 16 is composed of plural series-connected resistors or plural parallel-connected resistors.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. An illumination circuit, comprising:

a first voltage source having a first positive electrode and a first negative electrode;

plural first light-emitting diodes, which are cold color temperature light-emitting diodes, wherein the plural first light-emitting diodes are connected with each other in parallel, and each of the plural first light-emitting diodes has a first input terminal and a first output terminal;

plural first resistive elements, wherein a first terminal of each first resistive element is connected with the first output terminal of the corresponding first light-emitting diode, and a second terminal of each first resistive element is connected with the first negative electrode of the first voltage source;

a first impedance element, wherein a first terminal of the first impedance element is connected with the first positive electrode of the first voltage source, and a second terminal of the first impedance element is connected with the first input terminal of each first light-emitting diodes;

a second voltage source having a second positive electrode and a second negative electrode;

plural second light-emitting diodes, which are warm color temperature light-emitting diodes, wherein the plural second light-emitting diodes are connected with each other in parallel, and each of the plural second light-emitting diodes has a second input terminal and a second output terminal;

plural second resistive elements, wherein a first terminal of each second resistive element is connected with the second output terminal of the corresponding second light-emitting diode, and a second terminal of each second resistive element is connected with the second negative electrode of the second voltage source; and a second impedance element, wherein a first terminal of the second impedance element is connected with the second positive electrode of the second voltage source, and a second terminal of the second impedance element is connected with the second input terminal of each second light-emitting diode.

2. The illumination circuit according to claim 1, wherein the first voltage source provides a first driving voltage, and a voltage from the first input terminal of each first light-emitting diode to the first negative electrode of the first voltage source is a first set voltage, wherein when a first current flows through each first light-emitting diode, a forward voltage of each first light-emitting diode is in a range between a first maximum forward voltage and a first minimum forward voltage, and a resistance value of each first resistive element=(the first set voltage−(the first maximum forward voltage+the first minimum forward voltage)/2)/the first current.

3. The illumination circuit according to claim 2, wherein the first driving voltage is 5V, the first set voltage is 4.5V, the first current is 20 mA, the first maximum forward voltage is 2.9V, and the first minimum forward voltage is 2.7V.

4. The illumination circuit according to claim 2, wherein the first driving voltage is 5V, the first set voltage is 4.5V, the first current is 20 mA, the first maximum forward voltage is 3.1V, and the first minimum forward voltage is 2.9V.

5. The illumination circuit according to claim 2, wherein the first driving voltage is 5V, the first set voltage is 4.5V, the first current is 20 mA, the first maximum forward voltage is 3.3V, and the first minimum forward voltage is 3.1V.

6. The illumination circuit according to claim 1, wherein the first voltage source provides a first driving voltage, a voltage from the first input terminal of each first light-emitting diode to the first negative electrode of the first voltage source is defined as a first set voltage, a first current flows through each first light-emitting diode, and a positive integer number of the plural first light-emitting diodes is N, wherein an impedance value of the first impedance element=(the first driving voltage−the first set voltage)/(the first current×N×a chromaticity adjustment value), wherein the chromaticity adjustment value is an additional parameter for adjusting the resistance value of the first impedance element according to a degree of variation between classification levels of the plural first light-emitting diodes and an ideal central classification level position, and the chromaticity adjustment value is less than or equal to 1.2 and greater than or equal to 0.8.

7. The illumination circuit according to claim 6, wherein the first driving voltage is 5V, the first set voltage is 4.5V, the first current is 20 mA, and the chromaticity adjustment value is 1.2, 1.15, 1.1, 1.05, 1, 0.95, 0.9, 0.85 or 0.8.

8. The illumination circuit according to claim 1, wherein the second voltage source provides a second driving voltage, and a voltage from the second input terminal of each second light-emitting diode to the second negative electrode of the second voltage source is a second set voltage, wherein when a second current flows through each second light-emitting diode, a forward voltage of each second light-emitting diode is in a range between a second maximum forward voltage and a second minimum forward voltage, and a resistance value of each second resistive element=(the second set voltage−(the second maximum forward voltage+the second minimum forward voltage)/2)/the second current.

9. The illumination circuit according to claim 8, wherein the second driving voltage is 5V, the second set voltage is 4.5V, the second current is 20 mA, the second maximum forward voltage is 2.9V, and the second minimum forward voltage is 2.7V.

10. The illumination circuit according to claim 8, wherein the second driving voltage is 5V, the second set voltage is 4.5V, the second current is 20 mA, the second maximum forward voltage is 3.1V, and the second minimum forward voltage is 2.9V.

11. The illumination circuit according to claim 8, wherein the second driving voltage is 5V, the second set voltage is 4.5V, the second current is 20 mA, the second maximum forward voltage is 3.3V, and the second minimum forward voltage is 3.1V.

12. The illumination circuit according to claim 1, wherein the second voltage source provides a second driving voltage, a voltage from the second input terminal of each second light-emitting diode to the second negative electrode of the second voltage source is defined as a second set voltage, a second current flows through each second light-emitting diode, and a positive integer number of the plural second light-emitting diodes is N, wherein an impedance value of the second impedance element=(the second driving voltage−the second set voltage)/(the second current×N×a chromaticity adjustment value), wherein the chromaticity adjustment value is an additional parameter for adjusting the resistance value of the second impedance element according to a degree of variation between classification levels of the plural second light-emitting diodes and an ideal central classification level position, and the chromaticity adjustment value is less than or equal to 1.2 and greater than or equal to 0.8.

13. The illumination circuit according to claim 12, wherein the second driving voltage is 5V, the second set voltage is 4.5V, the second current is 20 mA, and the chromaticity adjustment value is 1.2, 1.15, 1.1, 1.05, 1, 0.95, 0.9, 0.85 or 0.8.

14. The illumination circuit according to claim 1, wherein one of the plural first light-emitting diodes and one of the plural second light-emitting diodes are packaged as a single dual-color light-emitting diode.

15. The illumination circuit according to claim 1, wherein the first impedance element comprises a single resistor, plural series-connected resistors or plural parallel-connected resistors.

16. The illumination circuit according to claim 1, wherein the second impedance element comprises a single resistor, plural series-connected resistors or plural parallel-connected resistors.

17. The illumination circuit according to claim 1, wherein the first resistive element comprises a single resistor, plural series-connected resistors or plural parallel-connected resistors.

18. The illumination circuit according to claim 1, wherein the second resistive element comprises a single resistor, plural series-connected resistors or plural parallel-connected resistors.

* * * * *